UNITED STATES PATENT OFFICE.

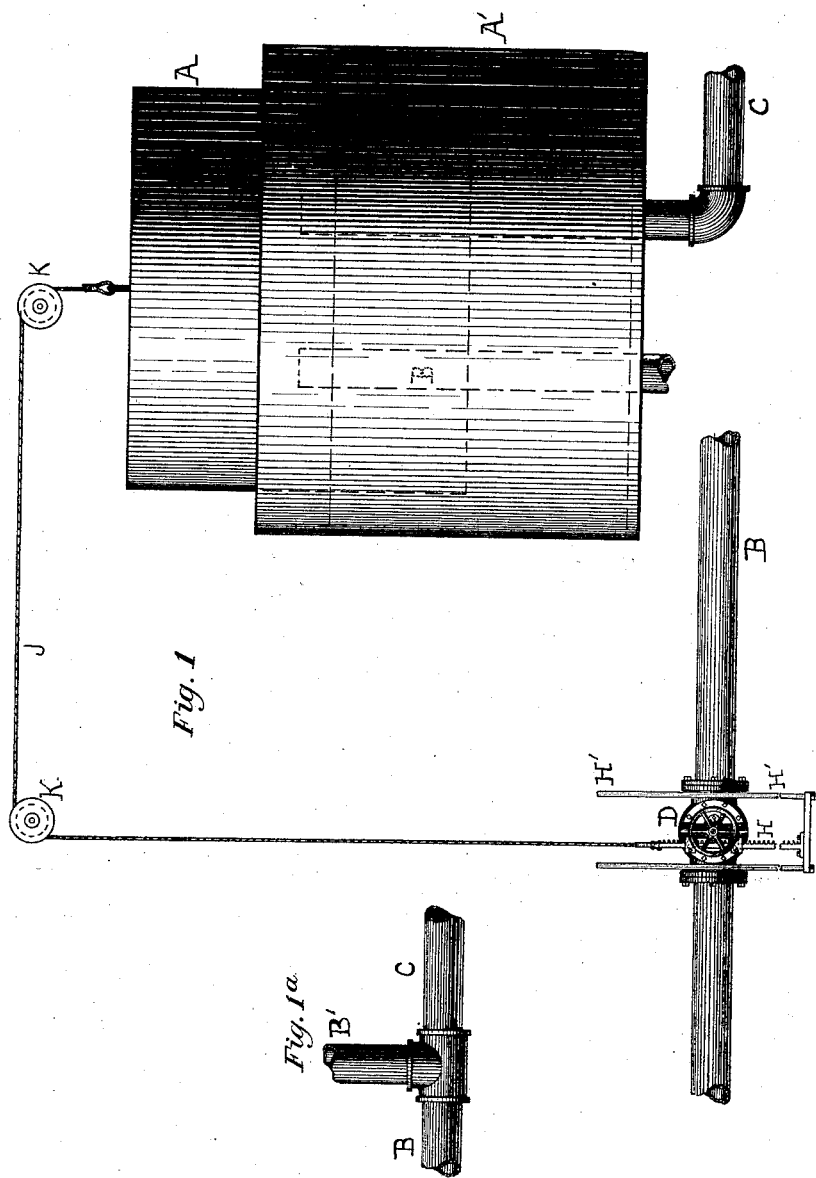

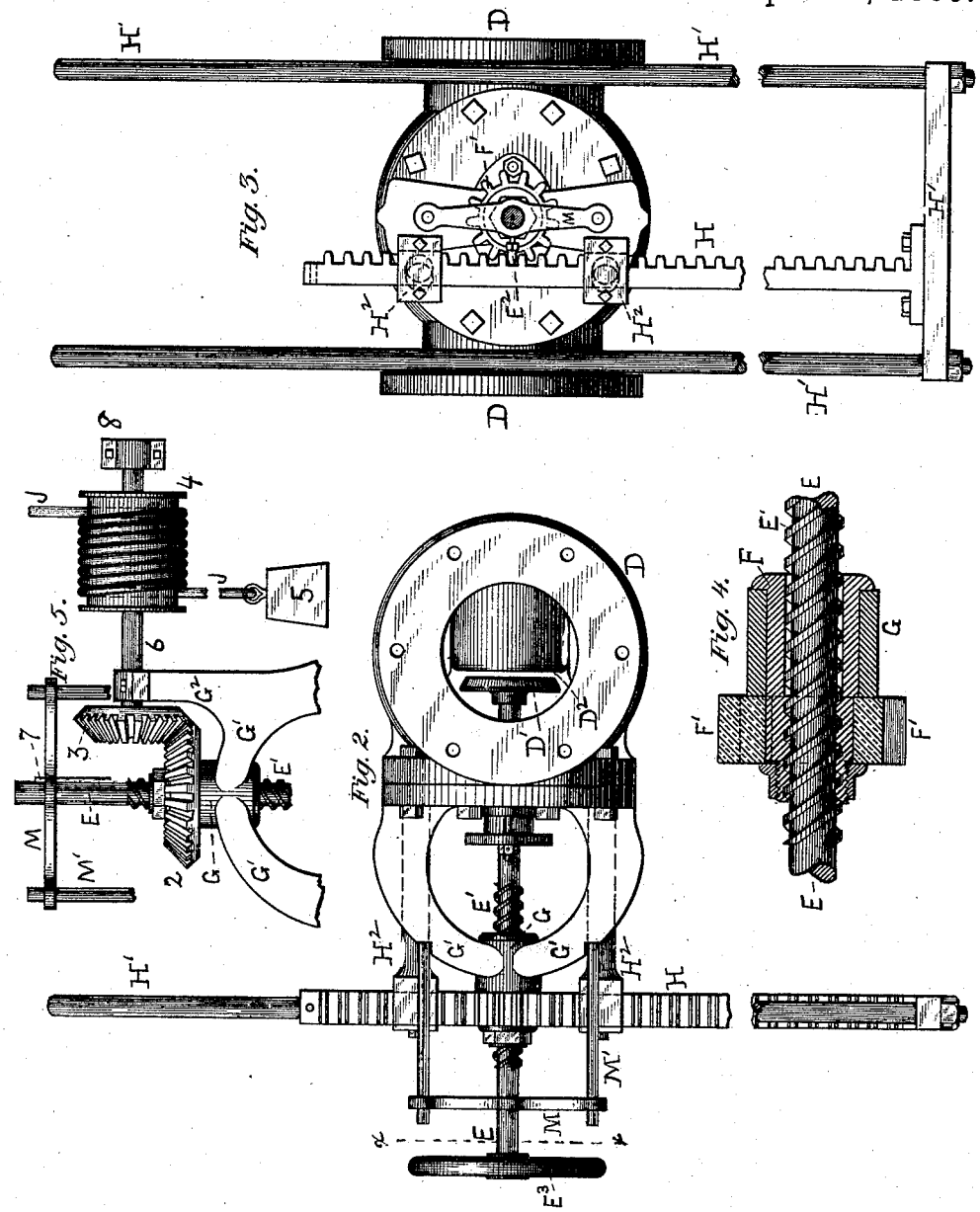

JAMES HUNTER, OF PITTSBURG, PENNSYLVANIA, ASSIGNOR OF ONE-HALF TO WILLIAM D. HARTUPEE, OF SAME PLACE.

GAS-REGULATOR.

SPECIFICATION forming part of Letters Patent No. 316,625, dated April 28, 1885.

Application filed January 22, 1885. (No model.)

*To all whom it may concern:*

Be it known that I, JAMES HUNTER, of Pittsburg, in the county of Allegheny and State of Pennsylvania, have invented a new and useful Improvement in Gas-Regulators; and I do hereby declare the following to be a full, clear, and exact description thereof.

My invention relates to an improvement in that class of gas-regulators in which the gas is fed to the point of use from a tank or holder which rises with the inflow of gas and falls in delivering it, the flow of gas into the holder being automatically increased when the tank falls and diminished in its ascent.

Devices of this class are of great use in the application of natural gas to furnaces or buildings of any kind, because this gas comes from the well at a great pressure in regular and intermittent gushes, and it has been found that tank-regulators are the best adapted to produce an even flow without complicated mechanism.

In my improved apparatus the tank is weighted, so as to deliver the gas at any desired pressure, and is connected with a shut-off valve, which is capable of opening and closing gradually in such manner that when gas is admitted to the tank too rapidly to be delivered at the required pressure the tank will rise and partially close the valve, thereby diminishing the volume of gas delivered into the tank. If, however, the flow of gas from the main should become checked and unable to counterbalance the pressure of the weighted tank, the tank will fall and act upon the valve through its intermediate mechanism, so as to open it more widely and allow more gas to enter the tank. In this manner a constant pressure is maintained on the gas fed from the regulator, the amount being accurately determined by the weight put upon the tank.

I will now describe my improvement with reference to the accompanying drawings, in which Figure 1 is a side elevation of my improved regulator. Fig. 1$^a$ is a view of a modification of a part. Fig. 2 is a side view of the regulating-valve and the mechanism for operating it. Fig. 3 is a vertical cross-section on the line $x$ $x$ of Fig. 2. Fig. 4 is a longitudinal sectional view of the valve-stem and its actuating mechanism. Fig. 5 is a side view of a modification.

Like letters of reference indicate like parts wherever they occur.

In the drawings, A represents the inverted cylinder or tank which receives and discharges the gas to the place of use. It is closed at the top, and its bottom is open, the tank being so mounted within an outer tank, A', as to be movable vertically therein. The tank A' is partially filled with water, and as the gas enters the holder A, it displaces the water and causes the holder to rise. The pressure of the tank when weighted causes it to expel its gas, and if the inflow be less than the outflow the holder will fall within the water-tank A'.

B is the branch main through which the gas enters the holder A, and C is the discharge-pipe leading to the place where the gas is used. The main pipe B is fitted with a valve-chamber, D, through which the gas must pass to the holder. It is opened and closed by means of a valve, D', preferably a globe-valve of the usual construction, which, as it is moved away from and toward its seat $D^2$, will permit a correspondingly greater or less amount of gas to pass through the valve-chamber. The form of valve used is immaterial, since any kind capable of operation as hereinafter described may be used.

The stem E of the valve D' projects from the valve outside of the valve-chamber, and is provided with a worm-thread, E', fitted around which is a correspondingly-threaded bushing, F, so that when the valve-stem is fixed in such manner as to prevent its turning rotation of the bushing will act upon the worm-threads E' and move the valve toward or away from its seat. The bushing F is held in place by an annular collar, G, which is secured to the valve-shell by suitable rigid arms, G'. The exterior of a part of the bushing F projects beyond the collar, and is provided with gear-teeth F', thus forming a pinion, which meshes into and is operated by a vertical rack, H. The threads of the bushing F and worm E' are so arranged that as the rack H is lowered and turns the pinion F' the valve-stem may move inward toward the valve-seat $D^2$, while an upward movement of the rack will reverse the motion of these parts and move the valve D' away from its seat. When the rack is at its lowest position, the valve will be entirely or almost entirely closed, with little or no gas escaping through the valve-chamber. When, however, it is fully raised, it will open the valve to its fullest extent. When the rack is in intermediate positions, the valve will have been moved so as to be partially opened, and the higher the situation of the rack the greater will be the flow of gas.

The rack H is bolted or otherwise secured to an upright frame, H', which is preferably of rectangular form, and is mounted on the valve-chamber D by means of rigid standards H², the ends of which are slotted or provided with suitable guide-boxes, within which the rack-frame is vertically movable. The slotted standards H² are attached to the shell of the valve-chamber in any suitable manner, and their function is to form rigid bearings to effect the proper motion of the rack. The purpose of the frame H' is to steady the rack and to give it sufficient weight to enable it to fall and operate the valve by its own gravity independently of any other motive power.

The rack H is operated by the movement of the gas-tank A by means of a rope or chain, J, which is attached to the tank and extends thence over sheaves K to the rack. It is evident that as the holder A falls it will act on the chain J and raise the rack, thereby increasing the flow of gas through the valve D, and as the tank rises it will allow the rack to fall by its own weight, thus closing the valve and diminishing the flow of gas. When the tank is weighted sufficiently to discharge the gas at any desired pressure—say one and a half pound—it will of itself come to a proper position to open the valve wide enough to supply just sufficient gas to maintain this pressure, and will stay at that point until the pressure in the main B either increases or grows less. If it increases, the tank A will be raised a little and will partially close the valve, and if there is a diminution of pressure it will fall and open the valve. In either case the valve will move far enough to compensate for the variation, and the tank will then come to rest. The action of the valve in this respect is so perfect as to neutralize the sudden changes common with natural gas and to produce a constant and even flow from the regulator.

It has been observed that the valve-stem E does not turn on its axis, but is moved directly inward by revolution of the pinion F'. It is kept thus rigidly by means of a set-screw, E², which bears against the stem with sufficient force to hold it. The stem passes through a collar on a cross-bar, M, which forms a part of a sliding frame, M', the side bars of which are mounted within longitudinal passages or holes in the standards G'. The set-screw E² passes through this collar, and when it is tightened bears against the valve-stem, so as to unite it with the movable frame M'. The frame will then prevent the valve-stem from turning; but as the pinion F' pushes the stem forward or backward the frame will likewise move with it. By loosening the screw E² the valve-stem is disconnected from the frame M', and is left free to rotate. It is clear that in such case the motion of the rack H and pinion F' will not move the valve D' to or from its seat, but will simply rotate the valve-stem and valve with the pinion on their axes. In this manner, by means of the set-screw E², the tank can readily be disconnected from the valve and used independently of any automatic action thereof. In order to enable the valve to be worked by hand when it is free from the tank, its stem is provided with a wheel, E³, by turning which the valve will be screwed toward or away from its seat, for the weight of the frame H' and rack H will keep the pinion F' and the worm-threaded bushing at rest, and the latter will act as a stationary bearing, against which the worm E' will work to move the valve-stem.

A modification of my improvement is shown in Fig. 5, in which the rack H of Figs. 2 and 3 is substituted by an equivalent mechanical device. The arrangement of the valve-stem E within a rotary bushing or pinion, F, which works within a fixed collar, G, is the same as before described. The pinion F is, however, provided with a miter-wheel, 2, affixed thereto, and into this miter-wheel meshes the teeth of a similarly-beveled gear-wheel 3. The latter is fixed to a shaft, 6, which is journaled in suitable bearings, G² and 8, and is provided with a drum, 4. The rope J, which is attached to the tank A, is wound around this drum several times, and is weighted at its free end, as at 5. It is therefore clear that as the tank falls it will act on the drum 4 to turn the gear-wheels 2 and 3, while as the tank rises the action of the weight 5 on the drum will turn them in a reverse direction. The valve-stem E is prevented from turning with its pinion F by means of the rigid frame or yoke M' through a cross-head, M, of which the stem passes. The latter is provided with a spline or feather, 7, which is fitted within a slot in the cross-head M. The feather and slot will allow the rectilinear non-rotary movement of the valve toward and away from its seat with the rotation of the gear-wheels 2 and 3.

When the valve is placed horizontally, as shown in Fig. 1, the rope and weight may be applied to operate the valve-stem E in the modification illustrated in Fig. 3 by substituting a drum for the pinion F' and wrapping the weighted rope around the drum, as before shown.

What I claim as my invention, and desire to secure by Letters Patent, is—

1. A valve for opening and closing the gas-supply pipe of a regulator-tank, the stem of the valve being threaded so as to be capable of being moved toward and away from its seat without rotation by means of gearing driven by motion of the gas-regulator tank, in combination with a non-rotatory yoke or frame, within which said stem is mounted to prevent rotation thereof, substantially as and for the purposes described.

2. The combination of the regulator-tank A with the rack H, movable by the rise and fall of the tank, the pinion F', rotatory by the action of said rack, and a valve the stem of which is capable of being moved by said pinion without rotation, substantially as and for the purposes described.

In testimony whereof I have hereunto set my hand this 2d day of January, A. D. 1885.

JAMES HUNTER.

Witnesses:
W. B. CORWIN,
THOMAS W. BAKEWELL.